(12) United States Patent
Van Delden

(10) Patent No.: US 7,697,194 B2
(45) Date of Patent: Apr. 13, 2010

(54) MOVING PARTICLE DISPLAY DEVICE

(75) Inventor: Martinus Hermanus Wilhelmus Maria Van Delden, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 12/376,140

(22) PCT Filed: Aug. 3, 2007

(86) PCT No.: PCT/IB2007/053059

§ 371 (c)(1),
(2), (4) Date: Feb. 3, 2009

(87) PCT Pub. No.: WO2008/017993

PCT Pub. Date: Feb. 14, 2008

(65) Prior Publication Data

US 2009/0296196 A1      Dec. 3, 2009

(30) Foreign Application Priority Data

Aug. 8, 2006   (EP) .................................. 06118600

(51) Int. Cl.
*G02B 26/00* (2006.01)
(52) U.S. Cl. ....................... 359/296; 345/107
(58) Field of Classification Search ................ 359/238, 359/296; 345/84, 85, 107
See application file for complete search history.

(56) References Cited

U.S. PATENT DOCUMENTS

| 3,612,758 | A | 10/1971 | Evans et al. |
| 6,639,580 | B1 | 10/2003 | Kishi et al. |
| 2003/0117016 | A1 | 6/2003 | Ukigaya |
| 2005/0006337 | A1 | 1/2005 | Takeda |
| 2008/0238868 | A1 | 10/2008 | Johnson et al. |
| 2008/0304134 | A1* | 12/2008 | Ban ........................... 359/296 |

FOREIGN PATENT DOCUMENTS

WO        2004008238 A1     1/2004

* cited by examiner

*Primary Examiner*—Timothy J Thompson
(74) *Attorney, Agent, or Firm*—Larry Liberchuk

(57) ABSTRACT

An improved moving particle display device having a plurality of pixels (12, 14; 21, 22, 23, 24) is disclosed. The pixels are formed between first (1) and second (2) substrates that are spaced apart by a plurality of partition walls (10; 20). Each pixel comprises charged particles (115) that are movable under the influence of primary electric field lines of force (16) to set the optical appearance of the pixel. The pixels further comprise blocking material (210) for physically blocking the charged particles from entering predetermined regions (200) of the pixels that are likely to have secondary electric field lines of force (18) that extend through the partition walls. Hence, the charged particles are blocked from entering regions of the pixels having secondary electric field lines of force that could attract the particles to move into any gaps (9) that exist between the partition walls and the substrates.

13 Claims, 3 Drawing Sheets

MOVING PARTICLE DISPLAY DEVICE

This invention relates to an improved moving particle display device, and in particular to an improved electrophoretic display.

Moving particle display devices have been known for many years, and are based on the principle that charged particles may be moved around under the influence of electric fields to alter the optical appearance of the display. For example, U.S. Pat. No. 3,612,758 describes an electrophoretic display where the appearance of an electrophoretic material is controllable by means of electric fields.

So called "In-plane" electrophoretic pixels use electric fields that are lateral to the display substrate to move particles from a masked region hidden from the viewer to an active viewing region. The larger the number of particles that are moved to or from the active region, the greater the change in the optical appearance of the pixel. Applicant's International Application WO2004/008238 gives an example of a typical in-plane electrophoretic display. In-plane electrophoretic pixels may be used to form transflective or transmissive displays.

The ratio of active pixel area (area whose optical appearance can be controlled) to inactive pixel area (area whose optical appearance cannot be controlled) is commonly known as the aperture ratio. The higher the aperture ratio, the higher the fraction of the pixel that can be controlled to change the pixel's optical appearance. A high aperture ratio enables a higher contrast ratio.

The manufacture of moving particle displays often comprises spacing two substrates apart by a plurality of partition walls, the partition walls defining a plurality of pixels between the first and second substrates. The pixels are filled with movable charged particles for controlling the optical appearance of each pixel.

One of the primary problems associated with forming these display devices is the difficulty of ensuring an adequate seal between the various pixels. The migration of charged particles from one pixel to another pixel, via gaps between the partition walls and the substrates, can cause very serious errors in the image displayed by the cells. For example, an in-plane electrophoretic pixel that becomes overloaded with charged particles may become unable to move all the charged particles away from the active region, dramatically reducing the brightness and contrast of the pixel. Furthermore, charged particles may leave one region of the pixel, and then re-enter at a different region of the pixel, disrupting the optical appearance of the pixel.

FIG. 1 shows a cross-sectional view of a known in-plane electrophoretic display comprising three pixels 4, 5, and 6. The pixels are formed by a reflective substrate 1 and a transparent substrate 2, which are spaced apart by a plurality of partition walls 10. The transparent substrate 2 is coated with regions of black masking 3 to mask a portion of each pixel from the view of a viewer 11. The pixels are filled with an electrophoretic fluid comprising movable charged particles 115, and the charged particles are movable between masked 111 and active 113 regions in order to set the optical appearance of the pixel. For example, all of the charged particles of pixel 5 have been moved to the masked region 111 beneath the black masking 3, and so an incident ray of light 7 passes through the electrophoretic fluid and back to the viewer. In contrast, all of the charged particles of pixel 6 have been moved into the active region 113, and so an incident ray of light 8 is absorbed by the charged particles 115 and not reflected back to the viewer 11. Hence, the optical appearance of each pixel may be controlled by altering the number and distribution of charged particles within the active region 113.

As can be seen on FIG. 1, the sealing between the partition walls 10 and the transparent substrate 2 is not perfect, and gaps 9 often exist between them. These gaps 9 are often caused by an excess of electrophoretic fluid within the pixels 4, 5, 6, which prevents the transparent substrate 2 from fully contacting the partition walls 10. The sizes of gaps 9 in the FIG. 1 are not drawn to scale. Hence, there is a tendency for particles to migrate from one pixel to another pixel via gaps 9, which may cause serious errors in the optical appearances of the pixels as outlined above.

A known approach to solving this problem is to try and increase the effectiveness of the seal between the partition walls and the substrates. However, this often involves adding fluids or adhesives to the pixels, and may cause a number of undesired effects, such as agglomeration or loss of charge of the particles, trapping of the charged particles between the partition walls and substrates, or undesired sticking of the particles to the substrates. Such effects may cause a deterioration in the quality of the display.

The width of the partition walls may be increased to make it harder for particles to cross the partition walls, although this takes up valuable display area and decreases the aperture of each pixel, thereby reducing the contrast of the display.

Another approach is to try and confine the particles to individual pixels by using electric fields. Several solutions that use guard electrodes between the borders of adjacent pixels to limit the movement of charged particles to within a single pixel have been proposed. Some of these solutions use guard electrodes mounted on the substrates, and spacers between the substrates to separate the substrates apart from one another. However, the spacers may cause a number of undesired effects, such as local motion distortion of the electrophoretic particles and particle depletion near spacer portions.

Other solutions use guard electrodes mounted on partition walls between the substrates. However, excellent alignment between the guard electrodes and the drive electrodes, as well as excellent electrode symmetry within a pixel, are typically required for effective display operation. Although these requirements can be fulfilled by conventional photolithography, image deterioration and contrast reduction may result from Moiré effects and from charged particle coverage and clearing difficulties at the center of the pixels.

It is therefore an object of the invention to provide an electrode layout that improves on the prior art.

According to a first aspect of the invention, there is provided a display device comprising first and second substrates spaced apart by a plurality of partition walls, the partition walls defining a plurality of pixels between the first and second substrates, each pixel comprising:

at least first and second drive electrodes that are spaced apart from one another and that are drivable with control signals to generate primary electric field lines of force extending between them;

charged particles that are movable under the influence of the primary electric field lines of force to set the optical appearance of the pixel; and wherein the control signals also generate secondary electric field lines of force (18) that extend:

in predetermined regions of a pixel of the plurality of pixels;

between an electrode of the pixel and an electrode associated with a neighboring pixel; and wherein the pixel further comprises blocking material for physically blocking the charged particles from the predetermined regions.

The charged particles typically move in the same direction or the opposite direction as the first and secondary electric field lines of force, depending on the polarity of the charged particles.

The secondary electric field lines of force extend between an electrode of a pixel and an electrode associated with a neighboring pixel. Hence, the secondary electric field lines of force typically extend through a partition wall of the pixel, and therefore may attract any particles that fall under the influence of the secondary electric field lines of force to move into or cross through any gaps that exist between the substrates and the partition walls.

The blocking material physically blocks the charged particles from entering predetermined regions of the pixel that are likely to have secondary electric field lines of force. Hence, the particles are prevented from moving into the regions of the pixel where they could be attracted by secondary electric field lines of force to move into any gaps that exist between the partition walls and the substrates. Therefore, the migration of charged particles between the pixel and neighboring pixels, due to secondary electric field lines of force, is greatly reduced.

The predetermined regions are typically determined by determining the regions of the pixels that are likely to have strong secondary electric field lines of force, given the electrode layout of the pixels and the electric potential differences that are likely to exist between the electrodes, as will be apparent to those skilled in the art. Clearly, the regions of the pixels that are likely to have the strongest secondary electric field lines of force (due to small separations or high potential differences between electrodes of different pixels) which may quickly attract charged particles into any gaps between the substrates and the partition walls, are good candidates for the blocking material.

The blocking material typically has a height that is substantially the same as the height of the partition walls. Hence, the blocking material typically extends between the first and second substrates, and physically blocks the charged particles from entering the predetermined regions.

The blocking material may also help to keep the charged particles in the regions of the pixel where primary electric field lines of force extend between the first and second electrodes, thereby keeping the charged particles under the influence of control signals applied to first and second electrodes, rather than allowing them to be influenced by control signals applied to electrodes associated with neighboring pixels.

Advantageously, the blocking material may block the charged particles from predetermined regions of a pixel where secondary electric field lines of force extend between the first drive electrode of the pixel and the first drive electrode of a neighboring pixel that is immediately adjacent to the pixel.

Hence, the first drive electrodes of immediately adjacent pixels may be driven with differing drive voltages, without the resulting secondary electric field lines of force between the first drive electrodes of the pixels causing large numbers of charged particles to cross the partition walls between the pixels.

Advantageously, the blocking material may block the charged particles from predetermined regions of a pixel where secondary electric field lines of force extend between the first drive electrode of the pixel and the second drive electrode of a neighboring pixel that is immediately adjacent to the pixel.

Hence, the first drive electrode of the pixel and the second drive electrode of the neighboring pixel may be driven with differing drive voltages, without any resulting secondary electric field lines of force between the first and second drive electrodes causing large numbers of charged particles to move between the pixels.

Furthermore, the plurality of pixels may be arranged in an array of rows and columns of pixels, each column being associated with a respective column electrode that is connected to or forms portions of the first drive electrodes of the pixels of the column, and each row being associated with a respective row electrode that is connected to or forms portions of the second drive electrodes of the pixels of the row.

Hence, the row and column electrodes may be used to control the first and second drive electrodes of each pixel of the display to set the optical appearance of the pixels individually. The plurality of pixels typically comprises over a hundred pixels, although there is no reason why smaller numbers of pixels could not be used for some applications.

Additionally, the blocking material may block the charged particles from predetermined regions of a pixel where secondary electric field lines of force extend between the first drive electrode of the pixel and a column electrode associated with an immediately adjacent pixel.

Hence, the first drive electrode of the pixel and the column electrode associated with the immediately adjacent pixel may be driven with differing drive voltages, without any resulting secondary electric field lines of force between the first drive electrode and the column electrode causing large numbers of charged particles to move into or cross through any gaps that exist between the partition walls and the substrates.

Furthermore, the blocking material may block the charged particles from predetermined regions of a pixel where secondary electric field lines of force extend between the first drive electrode of the pixel and portions of a row electrode associated with the pixel, the portions being outside of the pixel.

Hence, the first drive electrode of the pixel and a row electrode associated with the pixel may be driven with differing drive voltages, without any resulting secondary electric field lines of force between the first drive electrode and the portions of the row electrode that are outside of the pixel causing large numbers of charged particles to move into or cross through any gaps that exist between the partition walls and the substrates.

Additionally, the blocking material may block the charged particles from predetermined regions of a pixel where secondary electric field lines of force extend between portions of a row electrode within the pixel and a column electrode associated with an immediately adjacent pixel.

Hence, a row electrode associated with the pixel and a column electrode associated with an immediately adjacent pixel may be driven with differing drive voltages, without any resulting secondary electric field lines of force between the row electrode and the column electrode causing large numbers of charged particles to move into or cross through any gaps that exist between the partition walls and the substrates.

Furthermore, each pixel may further comprise a third drive electrode. The first, second and third drive electrodes may be drivable with control signals to move the charged particles between the first and third electrodes to set the optical appearance of each pixel. Each row of pixels may be associated with a respective viewing electrode that is connected to or forms portions of the third drive electrodes of the pixels of the row.

The viewing electrodes may be orthogonal to the column electrodes, and the blocking material may block the charged particles from predetermined regions of a pixel where secondary electric field lines of force extend between a portion of a viewing electrode within the pixel and a column electrode associated with an immediately adjacent pixel.

Hence, a viewing electrode associated with the pixel and a column electrode associated with an immediately adjacent pixel may be driven with differing drive voltages, without any resulting secondary electric field lines of force between the viewing electrode and the column electrode causing large numbers of charged particles to move into or cross through any gaps that exist between the partition walls and the substrates.

Furthermore, each pixel may further comprise a fourth drive electrode. The first, second, third and fourth drive electrodes may be drivable with control signals to distribute a number of charged particles between the third drive electrode and the fourth drive electrode, thereby setting the optical appearance of the pixel. Each row of pixels may be associated with a respective second viewing electrode that is connected to or forms portions of the fourth drive electrodes of the pixels of the row.

The second viewing electrodes may be orthogonal to the column electrodes, and the blocking material may block the charged particles from predetermined regions of a pixel where secondary electric field lines of force extend between a portion of a second viewing electrode within the pixel and a column electrode associated with an immediately adjacent pixel.

Hence, a second viewing electrode associated with the pixel and a column electrode associated with an immediately adjacent pixel may be driven with differing drive voltages, without any resulting secondary electric field lines of force between the second viewing electrode and the column electrode causing large numbers of charged particles to move into or cross through any gaps that exist between the partition walls and the substrates.

The column electrodes may be aligned with the partition walls, such that they are formed on the first substrate beneath the partition walls, or on the second substrate above the partition walls. Hence, the column electrodes may not take up significant area within the pixels, leaving a greater area available for the active regions of the pixels, and hence improving the aperture ratio and contrast of the pixels.

Advantageously, the display device may comprise in-plane electrophoretic pixels. Hence, the control signals applied to the at least first and second drive electrodes may cause the charged particles to move laterally to the substrates to set the optical appearances of the pixels. Therefore, the pixels may be used to implement transflective or transmissive displays.

Advantageously, the blocking material may be arranged so a pixel has at least one axis of symmetry. Hence, any electrohydrodynamic turbulence induced in the moving particle material of the pixel may be impacted equally and symmetrically near the enclosing portions of the partition walls, and thus there may be no net off-set in the displacement of the moving particles in the material.

Advantageously, the blocking material may be formed from the same material as the partition walls, which may help to simplify the manufacturing process.

Advantageously, the blocking material may intrude inwardly from a partition wall of a pixel. Furthermore, the intrusions of blocking material may be formed by selectively increasing the width of the partition walls into the predetermined regions, which may also help to simplify the manufacturing process. The intrusions could also be described as protrusions that protrude outwards from the partition walls and inwardly into the pixel.

Embodiments of the invention will now be described, by way of example only, and with reference to the accompanying drawings, in which.

The figures are not drawn to scale, and same or similar reference signs denote same or similar features.

Figure 2:
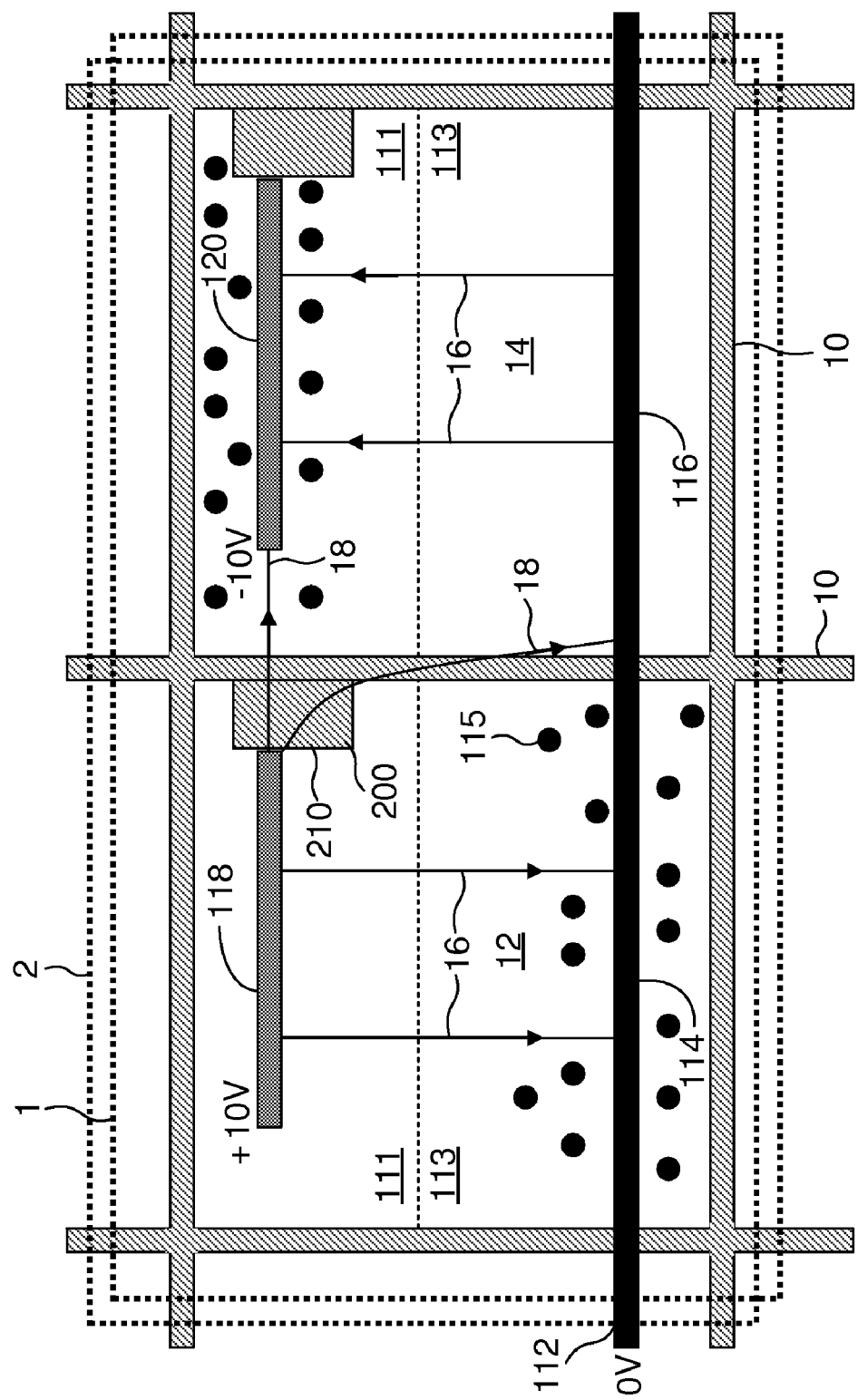
FIG. 2 shows a plan schematic diagram of two pixels of a display device according to a first embodiment of the invention.

A first illustrative embodiment of the invention is now described with reference to FIG. 2. FIG. 2 shows first and second in-plane electrophoretic pixels 12 and 14 that are formed by partition walls 10 between first 1 and second 2 substrate layers. Each pixel comprises a first drive electrode 118, 120 and a second drive electrode 114, 116. The first drive electrodes 118 and 120 are connected to column electrodes, which are not shown for clarity, and the second drive electrodes 114 and 116 are portions of a row electrode 112. The row, column, and drive electrodes are formed on one or both of the first and second substrates.

Figure 1:
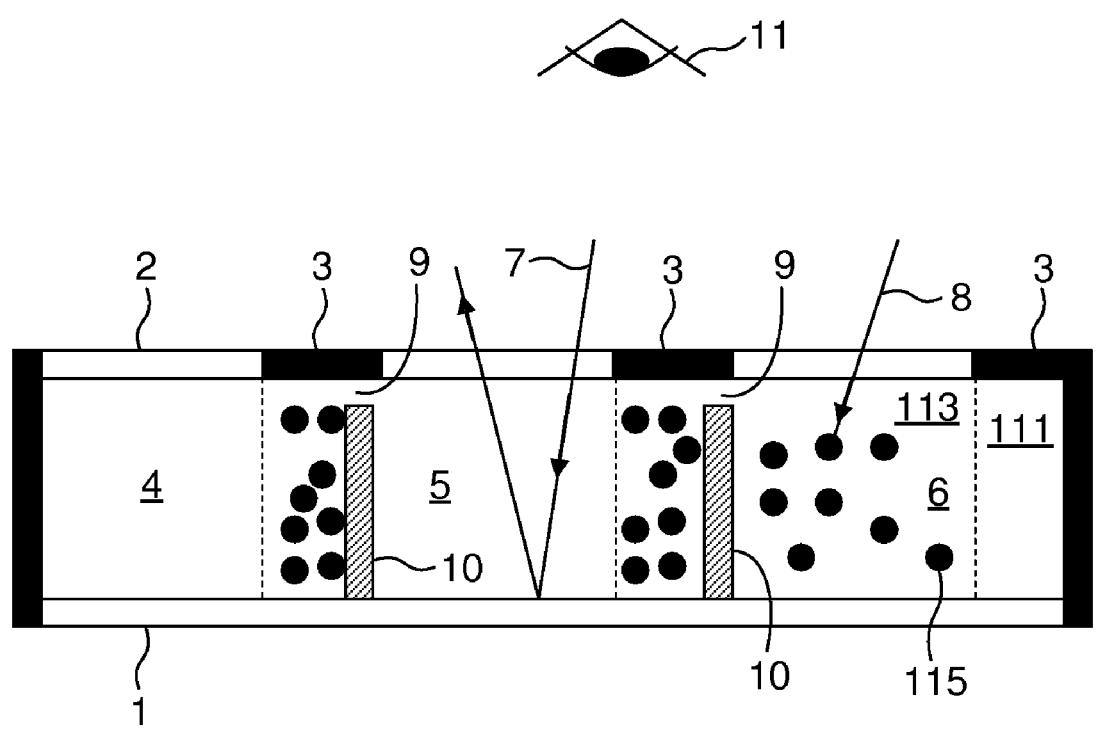
FIG. 1 shows a cross sectional diagram of a known display device.

The voltages on the drive electrodes of each pixel are controlled to set up primary electric field lines of force 16 for moving charged particles 115 of each pixel between a masked region 111 and an active region 113 to set the optical appearance of the pixel. The charged particles 115 in this example are colored black, and so the more of them that are moved into active region 113, the closer to black the pixel appears. The charged particles may for example be colored using dyes or pigments, or they may be made from naturally colored materials, such as for example carbon or titanium oxide. The masked region 111 is covered by a black mask (not shown for clarity) on the second substrate 2, similar to the mask that covers region 111 of FIG. 1. Hence, the masked region 111 always appears substantially black, as will be apparent to those skilled in the art. Therefore the optical appearance of the pixel depends on the number of charged particles 115 that are within the active region 113.

The first and second pixels 12 and 14 are shown in a state where a voltage of +10V is applied to the first drive electrode 118, a voltage of −10V is applied to the first drive electrode 120, and a voltage of 0V is applied to the row electrode 112 (and hence to the first and second drive electrodes 114 and 116).

The charged particles 115 are positively charged so that they move in the same direction as primary electric field lines of force 16 to set the optical appearance of each pixel. Alternatively, the charged particles 115 could be negatively charged, so that they move in the opposite direction to primary electric field lines of force 16, as will be apparent to those skilled in the art.

In addition to the primary electric field lines of force 16, secondary electric field lines of force 18 extend between the first drive electrode of the pixel 12, and the first and second drive electrodes of the second neighboring pixel 14, via a partition wall 10. The pixel 12 comprises blocking material 210 within predetermined regions 200, and the blocking material intrudes inwardly into the pixel from partition wall 10. The blocking material 210 physically blocks the charged particles 115 of the pixel 12 from the predetermined regions 200 of the pixel 12 that have the secondary electric field lines of force 18. Hence, the charged particles 115 of pixel 12 are physically blocked from entering the predetermined regions 200 of the pixel 12, where the particles could fall under the influence of secondary electric field lines of force 18 that may attract the particles to move into or cross through any gaps between the substrates and the partition walls.

Other secondary electric field lines of force are also likely to exist within the pixels, for example electric field lines of force that extend between the pixels 12, 14 and other pixels forming part of the same display device. Secondary electric field lines of force are also likely to extend between the drive electrodes of a pixel and the column electrodes (not shown for clarity) associated with neighboring pixels.

The blocking material 210 is formed integrally with the partition wall 10, by selectively increasing the width of the partition wall into the predetermined regions 200 that are likely to have secondary electric field lines of force. Alternatively, the blocking material may be formed separately from the partition walls. The blocking material 210 is a rectangular block of material substantially having the same height as the partition walls, although alternatively the blocking material may be formed in other shapes, such as triangular shapes, provided the shapes are suitable for physically blocking the charged particles from predetermined regions that have been determined as being likely to have secondary electric field lines of force.

The blocking material could be formed as an additional section of walling between the first and second substrates, for physically blocking particles from entering predetermined regions of a pixel that are likely to have secondary electric field lines of force.

In this example, the blocking material is made from the same material as the partition walls, such as SU-8. SU-8 is a multifunctional epoxide that can be structured by masked photocuring following a cationic polymerization mechanism, where the unexposed areas are removed by a solvent. Alternatively, the blocking material may be formed from a different material to the partition walls.

The first 12 and second 14 pixels are two representative pixels of an array of hundreds of pixels that together form part of an electrophoretic display device.

Figure 3:
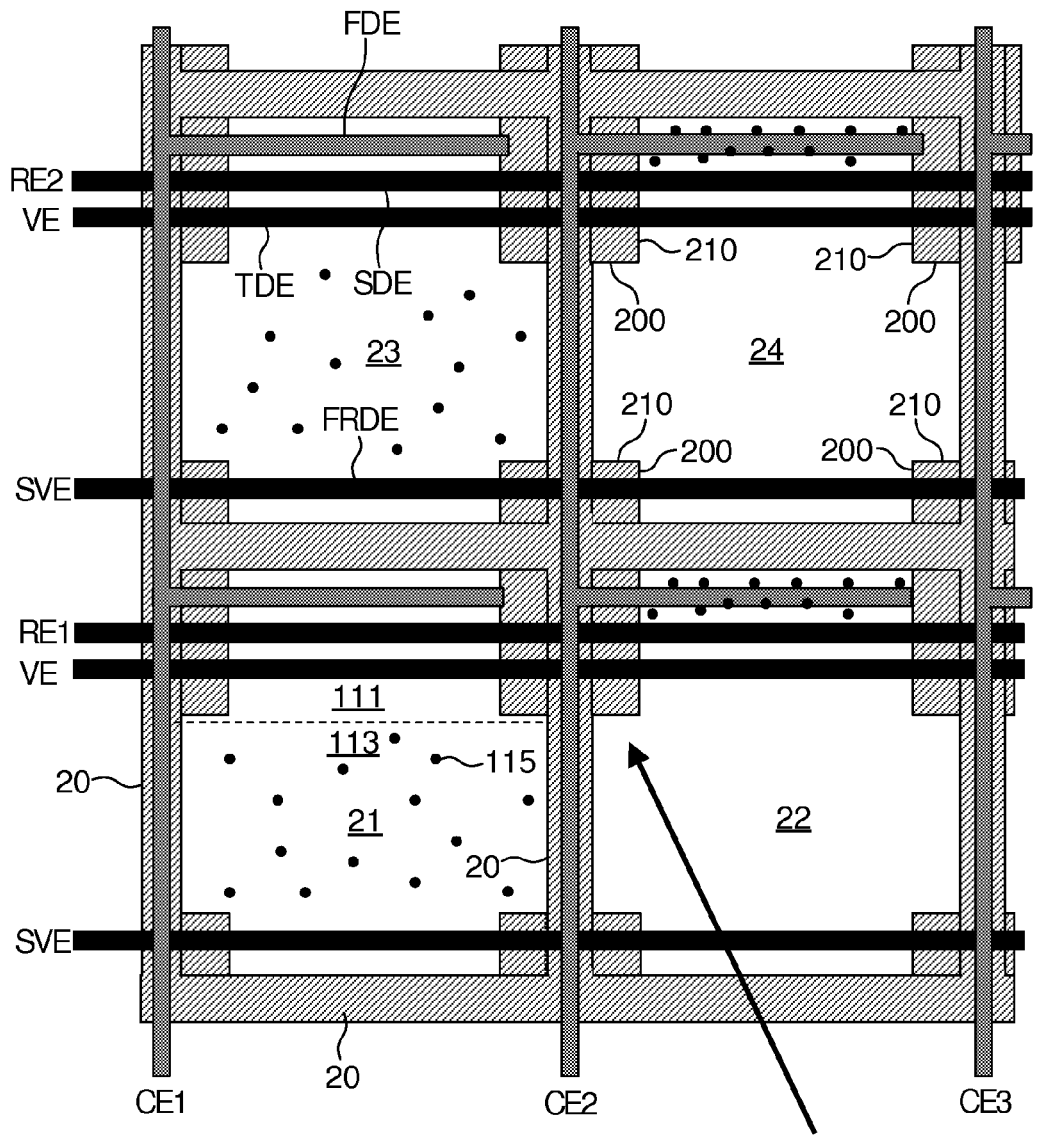
FIG. 3 shows a plan schematic diagram of four pixels of a display device according to a second embodiment of the invention.
Figure 3:
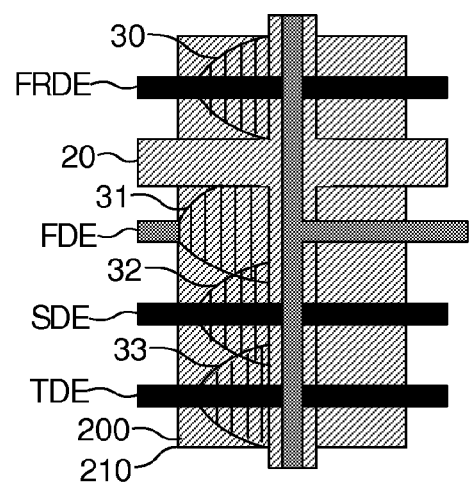

A second embodiment of the invention is now described with reference to FIG. 3. FIG. 3 shows a plan diagram of an array of four illustrative electrophoretic pixels 21, 22, 23, 24, which form a portion of an array of a display device. The pixels are formed between first and second substrates (not shown for clarity) that are spaced apart by partition walls 20, in a similar manner to the pixels of FIG. 2.

Each pixel comprises a first drive electrode FDE, a second drive electrode SDE, a third drive electrode TDE, and a fourth drive electrode FRDE. The first, second and third drive electrodes within a masked region 111 are used to move a number of charged particles 115 to the region of the third drive electrode TDE, the number determined according to the required optical appearance of the pixel. The fourth drive electrode FRDE is used to attract the number of charged particles from the region of the third drive electrode TDE to the region of the fourth drive electrode FRDE, and into an active region 113, thereby setting the optical appearance of the pixel.

The array comprises three column electrodes CE1, CE2, and CE3. The column electrode CE1 is connected to the first drive electrodes FDE of pixels 21 and 23, and the column electrode CE2 is connected to the first drive electrodes FDE of pixels 22 and 24. The column electrode CE2 is aligned above the partition wall 20 between the pixels 21 and 22, and between the pixels 23 and 24. The column electrode CE3 is connected to the drive electrodes of a further column of pixels that are not shown on the Fig. The array further comprises row electrodes RE1 and RE2. Portions of the row electrode RE1 form the second drive electrodes SDE of the pixels 21 and 22, and portions of the row electrode RE2 form the second drive electrodes SDE of the pixels 23 and 24. The array comprises viewing electrodes VE that form the third drive electrodes TDE of each pixel, and second viewing electrodes SVE that form the fourth drive electrodes FRDE of each pixel. The row, column, viewing, second viewing, and drive electrodes, are formed on one or both of the first and second substrates.

In operation, firstly the array is reset by simultaneously attracting all the (positively) charged particles 115 of each pixel to the region of the pixel's first drive electrode. To do this, all the first drive electrodes FDE are set to 0V via the column electrodes CE1, CE2 and CE3, all the second drive electrodes SDE are set to +5V via the row electrodes RE1 and RE2, all of the third drive electrodes TDE are set to +10V via the viewing electrodes VE, and all of the fourth drive electrodes FRDE are set to +15V via the second viewing electrodes SVE. Next, the second drive electrodes SDE are all set to +50V via the row electrodes RE1 and RE2, to hold all the charged particles within the regions of the first drive electrodes FDE, and the viewing electrodes are set to −5V, and the second viewing electrodes are set to −10V.

Secondly, each row of pixels is addressed in turn. To address a row of pixels, the voltage of the row electrode associated with the row of pixels is lowered, and the data for the pixels of the row is applied to the column electrodes. For example, for the row of pixels 21 and 22, the voltage on the row electrode RE1 is lowered to +10V, and the column electrode CE1 is set to a data voltage of +25V, and the column electrode CE2 is set to a data voltage of +0V. This causes the charged particles 115 of pixel 21 to move from the region of the first drive electrode FDE (at +25V), past the second drive electrode SDE (at +10V), and to the region of the third drive electrode TDE (−5V), and then to move to the region of the fourth drive electrode FRDE (−10V), thereby moving the particles 115 into the active region 113 and changing the optical appearance of the pixel 21. Since the first drive electrode of pixel 22 is set at 0V, the particles 115 of pixel 22 remain at the first drive electrode. The charged particles 115 of the pixels 23 and 24 are unaffected by these column electrode voltages, since the row electrode RE2 is still up at +50V.

Next, the voltage of the row electrode RE1 is raised back up to +50V, and the voltage of row electrode RE2 is lowered to +10V so that the optical appearances of pixels 23 and 24 can be set in a similar manner to pixels 21 and 22.

For further details of pixel addressing schemes that are applicable to electrophoretic displays having similar electrode layouts, the reader is referred to Applicant's co-pending US patent application U.S. 60/726,854 (Agents reference PH002317).

The expanded diagram within FIG. 3 shows a larger view of the partition walls, blocking material, and electrodes, at the areas between the four pixels 21, 22, 23, 24. Some of the regions of the pixels 21 and 23 that are likely to have secondary electric field lines of force, due to electric potential differences between the various electrodes, are indicated by reference numerals 30, 31, 32, 33.

During the addressing of pixels 21 and 22, secondary electric field lines of force extend between the first drive electrode FDE (at +25V) of pixel 21 and the first drive electrode FDE (at 0V) of pixel 22, between the first drive electrode FDE (at +25V) of pixel 21 and the column electrode CE2 (at 0V), and between the first drive electrode FDE (at +25V) of pixel 21 and the second drive electrode SDE (at +10V) of pixel 22. The blocking material 210 physically blocks the particles 115 from entering the predetermined regions 200 of the pixel 21 having the secondary electric field lines of force. Hence, the particles 115 of pixel 21 are blocked from the regions 31 where they could be attracted to move into or cross through any gaps that exist between the substrates and the partition walls.

During the addressing of pixels 21 and 22, secondary electric field lines of force extend between the column electrode CE2 (at 0V) that is aligned with the partition wall 20 between the pixels 21 and 22, and the portion SDE of the row electrode RE1 (at +10V) within the pixel 21. The blocking material 210 physically blocks the particles 115 from entering predetermined regions 200 of the pixel 21 having the secondary electric field lines of force. Hence, the particles 115 of pixel 21 are blocked from the regions 32 where they could be attracted to move into or cross through any gaps that exist between the substrates and the partition walls.

During the reset of the array, secondary electric field lines of force extend between the column electrode CE2 (at 0V) that is aligned with the partition wall 20 between the pixels 21 and 22, and the portion TDE of the viewing electrode VE (at +10V) within the pixel 21. The blocking material 210 physically blocks the particles 115 from entering predetermined regions 200 of the pixel 21 having the secondary electric field lines of force. Hence, the particles 115 of pixel 21 are blocked from the regions 33 where they could be attracted to move into or cross through any gaps that exist between the substrates and the partition walls.

During the reset of the array, secondary electric field lines of force extend between the column electrode CE2 (at 0V) that is aligned with the partition wall 20 between the pixels 23 and 24, and the portion FRDE of the second viewing electrode SVE (at +15V) within the pixel 21. The blocking material 210 physically blocks the particles 115 from entering the predetermined regions 200 of the pixel 21 having the secondary electric field lines of force. Hence, the particles 115 of pixel 23 are blocked from the regions 33 where they could be attracted to move into or cross through any gaps that exist between the substrates and the partition walls.

Each pixel has a line of symmetry extending through the centre of the pixel and in line with the columns. Hence, any electro-hydrodynamic turbulence induced in each pixel is impacted equally and symmetrically near the enclosing portions of the pixel walls, and so no net off-set in the displacement of the particles 115 is induced.

In summary there is provided an improved moving particle display device having a plurality of pixels. The pixels are formed between first and second substrates that are spaced apart by a plurality of partition walls. Each pixel comprises charged particles that are movable under the influence of primary electric field lines of force to set the optical appearance of the pixel. The pixels further comprise blocking material for physically blocking the charged particles from entering predetermined regions of the pixels that are likely to have secondary electric field lines of force that extend through the partition walls. Hence, the charged particles are blocked from entering regions of the pixels having secondary electric field lines of force that could attract the particles to move into any gaps that exist between the partition walls and the substrates.

The invention has been described in connection with in-plane electrophoretic display pixels, although the concepts may be extended to other types and configurations of moving particle display devices.

Although reference has been made to rows and columns of pixels in the description, it will be appreciated that these terms can be interchanged. For example, if the display is rotated by 90° then the rows may be considered as columns and the columns may be considered as rows. In essence, the rows and columns of pixels extend in directions that are orthogonal to one another.

For ease of understanding, the blocking material has been described in relation to a pixel of a plurality of pixels, although it is to be understood that the blocking material could equally be applied to each pixel of the plurality of pixels, as illustrated in FIG. 3.

Other embodiments falling within the scope of the appended claims will also be apparent to those skilled in the art. In particular, various features of the embodiments described herein may be combined to form further embodiments. Reference signs in the claims are not to be construed so as to limit the scope of the claims.

The invention claimed is:

1. A display device comprising first (1) and second (2) substrates spaced apart by a plurality of partition walls (10; 20), the partition walls defining a plurality of pixels (12, 14; 21, 22, 23, 24) between the first and second substrates, each pixel comprising:
   at least first (118, 120; FDE) and second (114, 116; SDE) drive electrodes that are spaced apart from one another and that are drivable with control signals to generate primary electric field lines of force (16) extending between them;
   charged particles (115) that are movable under the influence of the primary electric field lines of force (16) to set the optical appearance of the pixel; and wherein the control signals also generate secondary electric field lines of force (18) that extend:
   in predetermined regions (200) of a pixel (12; 21) of the plurality of pixels;
   between an electrode (118; FDE, SDE, TDE, FRDE) of the pixel (12; 21) and an electrode (120, 116; FDE, SDE, TDE, FRDE, CE2, RE1, VE, SVE) associated with a neighboring pixel (14; 22); and wherein the pixel (12; 21) further comprises blocking material (210) for physically blocking the charged particles (115) from the predetermined regions (200).

2. The display device of claim 1, wherein the blocking material (210) blocks the charged particles from predetermined regions (200) of the pixel (12; 21) where the secondary electric field lines of force (18) extend between the first drive electrode (118; FDE) of the pixel (12; 21) and the first drive electrode (120; FDE) of a neighboring pixel (14; 22) that is immediately adjacent to the pixel (12; 21).

3. The display device of claim 1, wherein the blocking material (210) blocks the charged particles (115) from predetermined regions (200) of the pixel (12; 21) where the secondary electric field lines of force (18) extend between the first drive electrode (118; FDE) of the pixel (12; 21) and the second drive electrode (116; SDE) of a neighboring pixel (14; 22) that is immediately adjacent to the pixel (12; 21).

4. The display device of claim 1, wherein the plurality of pixels (21, 22, 23, 24) are arranged in an array of rows and columns of pixels, each column being associated with a respective column electrode (CE1, CE2, CE3) that is connected to or forms portions of the first drive electrodes (FDE) of the pixels of the column, and each row being associated with a respective row electrode (RE1, RE2) that is connected to or forms portions of the second drive electrodes (SDE) of the pixels of the row.

5. The display device of claim 4, wherein the blocking material (210) blocks the charged particles (115) from predetermined regions (200) of the pixel (21) where the secondary electric field lines of force extend between the first drive electrode (FDE) of the pixel (21) and a column electrode (CE2) associated with an immediately adjacent pixel (22).

6. The display device of claim 4, wherein the blocking material (210) blocks the charged particles (115) from predetermined regions (200) of the pixel (21) where the secondary electric field lines of force extend between the first drive electrode (FDE) of the pixel (21) and portions of a row electrode (RE1) associated with the pixel, the portions being outside of the pixel (21).

7. The display device of claim 4, wherein the blocking material (210) blocks the charged particles (115) from predetermined regions (200) of the pixel (21) where the secondary electric field lines of force extend between a portion (SDE) of a row electrode (RE 1) within the pixel (21) and a column electrode (CE1, CE2) associated with an immediately adjacent pixel (22).

8. The display device of claim 7, wherein each pixel further comprises a third drive electrode (TDE), wherein each row of pixels is associated with a respective viewing electrode (VE) that is connected to or forms portions of the third drive electrodes (TDE) of the pixels of the row, the viewing electrodes (VE) being orthogonal to the column electrodes (CE1, CE2, CE3); and wherein the blocking material (210) blocks the charged particles (115) from predetermined regions (200) of the pixel (21) where the secondary electric field lines of force extend between a portion (TDE) of a viewing electrode (VE) within the pixel (21) and a column electrode (CE1, CE2) associated with an immediately adjacent pixel (22).

9. The display device of claim 8, wherein each pixel further comprises a fourth drive electrode (FRDE); wherein each row of pixels is associated with a second viewing electrode (SVE) that is connected to or forms portions of the fourth drive electrodes of the pixels of the row, the second viewing electrodes being orthogonal to the column electrodes (CE1, CE2, CE3); and wherein the blocking material (210) blocks the charged particles (115) from predetermined regions (200) of the pixel (21) where the secondary electric field lines of force extend between a portion (FRDE) of a second viewing electrode (VE) within the pixel (21) and a column electrode (CE1, CE2) associated with an immediately adjacent pixel (22).

10. The display device of claim 1, wherein the plurality of pixels are in-plane electrophoretic pixels (21, 22, 23, 24).

11. The display device of claim 1, wherein the blocking material (210) is arranged so that the pixel (12; 21) has at least one axis of symmetry.

12. The display device of claim 1, wherein the blocking material (210) is formed from the same material as the partition walls.

13. The display device of claim 1, wherein the blocking material (210) intrudes inwardly from a partition wall of the pixel (12; 21), and wherein the intrusions of blocking material (210) are formed by selectively increasing the width of the partition walls into the predetermined regions (200).

* * * * *